United States Patent [19]

Sato et al.

[11] Patent Number: 5,466,521
[45] Date of Patent: * Nov. 14, 1995

[54] FILM FOR HIGH HEAT-SENSITIVE STENCIL PAPER

[75] Inventors: Yoshinori Sato, Yamato; Megumi Komiyama, Tokyo; Kazuo Endo; Masashi Tate, both of Yokohama, all of Japan

[73] Assignee: Diafoil Hoechst Company, Ltd., Tokyo, Japan

[ * ] Notice: The portion of the term of this patent subsequent to Apr. 4, 2006, has been disclaimed.

[21] Appl. No.: 216,118

[22] Filed: Mar. 23, 1994

[30] Foreign Application Priority Data

Mar. 25, 1993 [JP] Japan .................... 5-066783

[51] Int. Cl.$^6$ ........................... B32B 5/06
[52] U.S. Cl. ............ 428/330; 428/323; 428/327; 428/329; 428/480; 428/910
[58] Field of Search .................... 428/480, 323, 428/327, 330, 329, 910

[56] References Cited

U.S. PATENT DOCUMENTS 4,766,033  8/1988  Yoshimura et al. ............ 428/481
5,061,565  10/1991  Aoki et al. ............ 428/409

FOREIGN PATENT DOCUMENTS

| 0210040 | 1/1987 | European Pat. Off. . |
| 0406884 | 1/1991 | European Pat. Off. . |
| 0453579 | 10/1991 | European Pat. Off. . |
| 62-149496 | 7/1987 | Japan . |
| 62-282983 | 12/1987 | Japan . |
| 63-160895 | 7/1988 | Japan . |
| 63-227634 | 9/1988 | Japan . |
| 63-312192 | 12/1988 | Japan . |
| 3-30996 | 2/1991 | Japan . |

*Primary Examiner*—Edith Buffalow
*Attorney, Agent, or Firm*—Foley & Lardner

[57] ABSTRACT

Disclosed is a film for high heat-sensitive stencil paper, comprising a biaxially oriented film having a thickness of 0.5 to 6.0 μm and formed from a polyester composition comprising polybutylene terephthalate and another polyester, a ratio of the polybutylene terephthalate in the whole polyester being 20 to 80 wt %, a maximum value of average heat shrinkage stresses in the machine and transverse directions of the film measured at a film temperature of 60° to 140° C. being more than 300 g/mm$^2$, and a heat shrinkage of the film by treatment at 100° C. for 3 minutes being not less than 20%.

19 Claims, No Drawings

FILM FOR HIGH HEAT-SENSITIVE STENCIL PAPER

BACKGROUND OF THE INVENTION

The present invention relates to a film for high heat-sensitive stencil paper and, particularly, to a film for high heat-sensitive stencil paper which has an excellent perforation sensitivity and an excellent printing quality, i.e., resolution and density of a printed image.

As a heat-sensitive stencil paper, a laminate composed of a film of a thermoplastic resin such as polyester and thin porous paper has been known. The film used for this purpose is required to have the following properties.

(1) The film is required to have a high thermal perforation sensitivity. The film is required to melt with a small quantity of heat and to have an adequate heat shrinkage which enables openings of an appropriate size for producing a clear printed image to be formed.

(2) The film is required to have high strength and elasticity enough to withstand operations of laminating with thin porous paper and printing. In addition, even if the operation includes a heating step, the film is required not to cause a problem such as curling of the stencil paper due to heating.

(3) The film is required to have good gradation in thermal perforation. The gradation of a printed image is deteriorated if a portion other than the portions to be perforated is melted due to the influence of the neighboring perforation. The film is required to have good thermal perforation property which can discriminate between the portions to be perforated and the portions not to be perforated.

In addition to these requirements, the film is required to be excellent in the handling property at the time of the production of the film and the formation of the stencil paper. For example, the stretching property is so good as not to cause a trouble such as breakage during production of the film, and that the wind-up property and slittabiltiy are so good as not to produce a crease on the film or as not to cause weaving. It is also necessary that no trouble is caused at the film winding step or the film running step during the formation of stencil paper.

As a film (biaxially oriented film formed from a thermoplastic resin) for heat-sensitive stencil paper, there have been proposed a film improved in printing characteristics by defining the thermal properties (Japanese Patent Application Laid-Open (KOKAI) No. 62-149496 (1987)), a film defined by the surface roughness and the number of protuberances on the film surface (Japanese Patent Application Laid-Open (KOKAI) No. 63-227634 (1988)) and films defined by the heat shrinkage properties (Japanese Patent Application Laid-Open (KOKAI) Nos. 62-282983 (1987), 63-160895 (1988), 63-312192 (1988), and 3-30996 (1991)) .

However, these proposed films cannot be said to be satisfactory for heat-sensitive stencil paper, especially, in the points of perforation sensitivity and printing quality.

As a result of various studies undertaken by the present inventors so as to solve the above-described problems, it has been found that a biaxially oriented film formed from a polyester having a specific composition and having the heat shrinkage and the heat shrinkage stress which satisfy specific conditions, is suited as a base film for heat-sensitive stencil paper. On the basis of this finding, the present invention has been achieved.

SUMMARY OF THE INVENTION

It is an object of the present invention to provide a film for high heat-sensitive stencil paper which is excellent in perforation sensitivity and printing quality.

To accomplish the aim, in an aspect of the present invention, there is provided a film for heat-sensitive stencil paper, comprising a biaxially oriented film having a thickness of 0.5 to 6.0 μm and formed from a polyester composition comprising polybutylene terephthalate and other polyester, a ratio of the polybutylene terephthalate in the whole polyester being 20 to 80 wt %, a maximum value of average heat shrinkage stresses in the machine and transverse directions of the film measured at a film temperature of 60° to 140° C. being more than 300 g/mm$^2$, and a heat shrinkage of the film treated at 100° C. for 3 minutes being not less than 20%.

DETAILED DESCRIPTION OF THE INVENTION

The polybutylene terephthalate (hereinunder referred to as "PBT") used in the present invention refers to a polyester in which at least 70 mol %, preferably at least 80 mol % of the dicarboxylic acid component is terephthalic acid, and at least 50 mol %, preferably at least 70 mol % of the glycol component is 1,4-butanediol. The polyester composition containing 20 to 80 wt % of PBT in the present invention means a composition which contains PBT and at least one polyester other than PBT. The polyester other than PBT means a polyester composed of a dicarboxylic acid component such as terephthalic acid, isophthalic acid and 2,6-naphthalenedicarboxylic acid, and a glycol component such as ethylene glycol, and it may also be a copolymer containing other components. Examples of a copolymerizable component besides the above-described components are dicarboxylic acids such as phthalic acid, cebacic acid and adipic acid; glycol components such as diethylene glycol, triethylene glycol, neopentyl glycol and 1,4-cyclohexanedimethanol; and oxycarboxylic acids such as p-hydroxybenzoic acid.

As a method of producing the polyester composition, a method by blending PBT and the other polyester, and melting and kneading the resultant mixture is preferably used. The content of PBT in the whole polyester is 20 to 80 wt %, preferably 30 to 80 wt %, more preferably 40 to 70 wt %. If the PBT content is less than 20 wt %, it is difficult to obtain the shrinkage characteristic for providing a high perforation sensitivity. On the other hand, if the PBT content exceeds 80 wt %, a stretching property in the production of the film is greatly deteriorated, thereby lowering the productivity.

The melting point of the polyester composition is preferably in the range of 150° to 240° C. when it is formed into a film. More preferably, the melting point is in the range of 160° to 230° C. If the melting point is lower than 150° C., a heat dimensional stability of the film may be lowered, and curling may occur in the process of producing stencil paper or during the preservation of the stencil paper, or the contrast of a printed image may be deteriorated. If the melting point is higher than 240° C. it may be difficult to obtain a high perforation sensitivity.

The melting point is measured by DSC (differential scanning calorimetry). In order to have a higher perforation sensitivity, it is preferable that at least two melting heat absorption peaks are observed. The difference in temperature between the heat absorption peaks is preferably not less than 5° C., more preferably not less than 10° C., still more preferably 10° to 50° C. In such a case, in the present invention, the temperature at the lowest peak (I) is regarded as the melting point when the energy calculated from the lowest peak (I) is not less than 30% to the sum of energies which are calculated from all the peaks. When the energy calculated from the lowest peak (I) is less than 30% to the sum of energies which are calculated from all the peaks, the temperature at the peak having the highest energy is regarded as the melting point.

It is important in the present invention that the maximum value of the average heat shrinkage stresses of the film measured in the film temperature range of 60° to 140° C. is not less than 300 g/mm$^2$. The average heat shrinkage stress means the average value of the heat shrinkage stresses of the film in the machine (longitudinal) direction and the transverse direction. If the maximum average heat shrinkage stress is less than 300 g/mm$^2$, the force for widening openings at the time of perforation is insufficient, so that it is difficult to obtain openings which are large enough to provide a clear printed image. The maximum average heat shrinkage stress is preferably 500 to 1500 g/mm$^2$, more preferably 550 to 1300 g/mm$^2$.

The average value of the heat shrinkage stress (Sm) (g/mm$^2$) of the film in the machine direction (a direction of scanning by a thermal head) measured at a film temperature of 100° C. and the heat shrinkage stress (St) (g/mm$^2$) of the film in the transverse direction (a direction perpendicular to the direction of scanning by the thermal head) measured at a film temperature of 100° C. is preferably not less than 300 (g/mm2). The average value is more preferably in the range of 500 to 1500 g/mm$^2$, most preferably in the range of 550 to 1300 g/mm$^2$.

The ratio (Sm/St) of the heat shrinkage stresses (Sm) and (St) measured at a film temperature of 100° C. is preferably in the range of 1.2 to 5. The heat shrinkage stress ratio (Sm/St) is more preferably in the range of 1.5 to 3.5. If the heat shrinkage stress ratio (Sm/St) is less than 1.2, the perforation sensitivity or printing durability may be low. On the other hand, if the heat shrinkage stress ratio (Sm/St) exceeds 5, the uniformity in the shape of the openings may be lost, so that the density and the resolution of a printed image may be deteriorated.

It is also important in the present invention that the heat shrinkage of the film by treatment at 100° C. for 3 minutes is not less than 20%, preferably 30 to 80%. If the heat shrinkage of the film is less than 20%, the perforation sensitivity is insufficient and the density of a printed image is insufficient.

In order to improve the handling property during the wind-up step in the production of a film, during the coating and laminating steps in the production of stencil paper, and during printing, and in order to prevent the film from being sticked to the thermal head due to fusion during thermal perforation, the surface of the film is ordinarily roughened so as to impart an appropriate slipperiness to the film. Roughening the surface of the film can be made by mixing particles with the polyester composition.

For example, 0.01 to 2.0 wt % of particles having an average particle diameter of 0.05 to 3.0 μm are contained in the film. Preferably, 0.1 to 1.5 wt % of particles having an average particle diameter of 0.1 to 2.0 μm are contained in the film. Examples of the particles are those of calcium carbonate, magnesium carbonate, barium carbonate, calcium sulfate, barium sulfate, calcium phosphate, lithium phosphate, magnesium phosphate, lithium fluoride, aluminum oxide (alumina), silicon oxide, titanium oxide, zeolite, kaolin, talc, carbon black, silicon nitride, boron nitride and crosslinked polymer particles such as those described in Japanese Patent Publication (Kokoku) No. 59-5216 (1984), but the particles contained in the film are not restricted to these examples. The particles may be used singly or in mixture. In the case of using in mixture at the same time, the average particle diameter and the total content of the particles are preferably in the above-described ranges. If the average particle diameter is less than 0.05 μm or the content of the particles is less than 0.01 wt %, the roughness of the film surface is apt to become insufficient. If the average particle diameter exceeds 3.0 μm or the content of the particles exceeds 2.0 wt %, the roughness of the film surface tends to become too large for uniform heat transfer, which leads to nonuniform perforation and inferior resolution and printing quality.

An especially preferable method of toughening the surface is a method of mixing, with the polyester composition, particles (A) which have an average particle diameter ($d_1$) of 0.6 to 3.0 μm and a Mohs hardness of not less than 5, and particles (B) which have an average particle diameter ($d_2$) of 0.06 to 0.8 μm and $d_1/d_2$ of 2 to 10. According to this method, the particles (A) having a high Mohs hardness have a favorable effect to counter the contamination on a thermal head. Although the reason is not clear, but it is deduced, from the fact that the particles having the hardness equal to or more than the hardness of the thermal head exerts a marked effect, that the particles forming the protuberances on the film surface rub off the contaminant which has adhered to the thermal head and polishes the thermal head, in other words, the particles have a cleaning effect.

If the Mohs hardness of the particles (A) is less than 5, after the stencil-making operation is repeated multiple times, contaminant may adhere to the thermal head, so that the perforation sensitivity is sometimes lowered. If the average particle diameter of the particles (A) is less than 0.6 μm, the wind-up property may be deteriorated. On the other hand, if the average particle diameter of the particles (A) exceeds 3.0 μm, the flatness of the film surface may be insufficient for uniform heat transfer, leading to nonuniform perforation, and inferior resolution and printing quality. If the average particle diameter of the particles (B) is less than 0.06 μm, the slipperiness may be insufficient, thereby sometimes lowering the operability. If the average particle diameter of the particles (B) exceeds 0.8 μm, the flatness of the film surface may be too low for uniform heat transfer, leading to nonuniform perforation, and inferior resolution and printing quality.

When the ratio ($d_1/d_2$) of the average particle diameter ($d_1$) of the particles (A) and the average particle diameter ($d_2$) of the particles (B) is in the range of 2 to 10, it is possible to rapidly reduce the adhering air layer during the film wind-up operation, so that a good wind-up property can be obtained. If the average particle diameter ratio ($d_1/d_2$) exceeds 10, the surface roughness of the film may become too large for uniform heat transfer, leading to nonuniform perforation and inferior resolution and printing quality.

The preferable Mohs hardness of the particles (A) is not less than 5.5, the preferable average particle diameter ($d_1$) of the particles (A) is 0.8 to 2.0 μm, and the preferable average particle diameter ($d_2$) of the particles (B) is 0.1 to 0.6 μm.

The content of the particles (A) is preferably 0.005 to 0.3 wt % in the film. It is preferable that the number of particles (A) in 1 g of the polyester resin is $8.85 \times 10^5$ to $1.33 \times 10^{10}$. More preferable content of the particles (A) is 0.01 to 0.2 wt %, and more preferable number of particles (A) in 1 g of the polyester resin is $1.77 \times 10^6$ to $8.84 \times 10^9$. If the content and the number of particles (A) are less than 0.005 wt % and $8.85 \times 10^5$, respectively, the wind-up property of the film may be deteriorated. On the other hand, if the content and the number of particles (A) exceed 0.3 wt % and $1.33 \times 10^{10}$, respectively, the surface roughness of the film may become too large for uniform heat transfer, leading to nonuniform perforation and inferior resolution and printing quality.

The content of the particles (B) is 0.05 to 3 wt % in the film. It is preferable that the number of particles (B) in 1 g of the polyester resin is $4.67 \times 10^8$ to $2.65 \times 10^{14}$. More preferable content of the particles (B) is 0.1 to 2 wt %, and more preferable number of particles (B) in 1 g of the polyester resin is $9.33 \times 10^8$ to $1.77 \times 10^{14}$. If the content and the number of particles (B) are less than 0.05 wt % and $4.67 \times 10^8$, respectively, the slipperiness may be insufficient, thereby lowering the operability. On the other hand, if the content and the number of particles (B) exceed 3 wt % and $2.65 \times 10^{14}$, respectively, the flatness of the film surface may be too low for uniform heat transfer, leading to nonuniform perforation and inferior resolution and printing quality.

Examples of the particles (A) having a Mohs hardness of not less than 5 are the particles of aluminum oxide (alumina), silicon oxide, titanium oxide, zeolite, Celite, silicon nitride and boron nitride. Examples of the particles (B) include those of calcium carbonate, magnesium carbonate, barium carbonate, calcium sulfate, barium sulfate, calcium phosphate, lithium phosphate, magnesium phosphate, lithium fluoride, kaolin, talc, carbon black, and crosslinked polymer particles such as those described in Japanese Patent Publication (Kokoku) No. 59-5216 (1984).

In the particles used in either of the methods of roughening the film surface, the particle size distribution $d_{25}/d_{75}$ measured by a later-described method is preferably 1.0 to 1.5, more preferably 1.1 to 1.3. If the particle size distribution $d_{25}/d_{75}$ exceeds 1.5, blunt protuberances may increase, so that the above-described effect may not be produced. From the point of view of the particle size distribution, it is the most preferable to use at least one selected from the group consisting of spherical silica, synthesized calcium carbonate and monodisperse crosslinked polymer particles such as those described in Japanese Patent Application Laid-Open (KOKAI) No. 2-194047 (1990). In order to mix the particles with the polyester composition, a method by adding the fine particles to the polyester composition at the polyester polymerization step or a method by melting and kneading the polyester composition with the particles before the formation of the film is preferably adopted.

In the present invention, the center-line average surface roughness (Ra) of the film is preferably 0.01 to 0.4 μm, because the operability of the film and the resolution and the printing quality of a printed image can be satisfied to a higher degree. The center-line average surface roughness (Ra) of the film is more preferably 0.02 to 0.3 μm. In addition, the maximum height (Rt) of the film surface is preferably 0.4 to 1.5 μm, more preferably 0.5 to 2 μm.

It is necessary in the present invention that the film thickness is 0.5 to 6 μm, preferably 0.8 to 3 μm. As the film thickness becomes thin, the range of heat conduction is shortened and, as a result, the heat energy necessary for perforation is reduced, thereby improving the perforation property and the printing quality. However, if the film thickness is less than 0.5 μm, a printed image is not clear, the density is apt to be lacking in uniformity, and the printing durability is lowered. On the other hand, if the film thickness exceeds 6 μm, a uniform printed image is not obtained.

Since the film of the present invention is very thin, it is preferable that the film has tensile modulus of not less than 300 kg/mm², more preferably not less than 350 kg/mm² in both the machine and transverse directions so as to enhance the handling operability and the printing durability.

A method of producing a polyester film of the present invention will now be explained. The polyester composition is supplied to a known melt-extruding apparatus such as an extruder so as to be heated to a temperature of not lower than the melting point of the polyester composition and melted. The molten polyester composition is extruded from a slit die, and rapidly cooled to a temperature of not higher than the glass transition temperature on a rotary cooling drum so as to be hardened. In this manner, a substantially amorphous sheet is obtained. In this case, since it is necessary to bring the sheet into as close contact as possible with the rotary cooling drum in order to improve the flatness of the sheet, an electrostatic pinning method and/or a liquid contact method is preferably adopted.

The electrostatic pinning method is a method in which a linear electrode is ordinarily provided above the upper surface of the sheet in the direction perpendicular to the flow of the sheet, and applying a direct voltage of about 5 to 10 kV to the linear electrode so as to apply electrostatic charges to the sheet, thereby bringing the sheet into closer contact with the drum. The liquid contact method is a method in which a liquid is uniformly applied to the whole part or a part (e.g., only the parts which come into contact with both edge portions of the sheet) of the surface of the rotary cooling drum, thereby bringing the sheet into closer contact with the drum. Both methods may be adopted in the present invention, if necessary.

In the present invention, the sheet obtained in this manner is biaxially stretched so as to form a film. The amorphous sheet is first stretched in one direction by a roll or tenter type stretching machine at a temperature of ordinarily 20° to 100° C., preferably 25° to 80° C. to ordinarily 3.0 to 7 times, preferably 3.5 to 7 times. Thereafter, the stretched film is stretched by a tenter type stretching machine in the direction perpendicular to the direction of stretch at the first stage at a temperature of ordinarily 20° to 100° C., preferably 25° to 90° C. to ordinarily 3.0 to 7 times, preferably 3.5 to 7 times, more preferably 4.0 to 7 times. Stretching the film in one direction can be conducted at two stages. In this case, the total stretch ratio is preferably in the above-described range. It is also possible to stretch the film simultaneously biaxially so that the stretch area ratio is 10 to 40.

The film obtained is heat-treated, if necessary. Before or after the heat treatment, the film may be restretched in the machine and/or transverse direction. In the present invention, in order to obtain a film having the above-described heat shrinkage properties, it is preferable that the stretch ratio (area ratio) is not less than 15, and substantially no heat treatment is conducted after the film is stretched. In the case of heat-treating the film, the heat-treating temperature is ordinarily not higher than 110° C., preferably not higher than 90° C., and the heat-treating time is 1 second to 5 minutes. The film is heat-treated under an elongation of within 30% or while holding the film at a constant length.

In the present invention, it is possible to add to the polyester composition less than about 10 wt % of another polymer (e.g., polyethylene, polystyrene, polycarbonate, polysulfone, polyphenylene sulfide, polyamide and polyimide) based on the whole amount of polyester which is formed into the film. It is possible to mix an additive such as antioxidant, heat stabilizer, lubricant, antistatic agent, dye and pigment with the polyester composition, if necessary.

The film obtained in the above-described manner is laminated with predetermined thin porous paper by an adhesive to produce heat-sensitive stencil paper, according to a conventional method. The heat-sensitive stencil paper obtained in this manner has a high perforation sensitivity and is excellent in resolution and gradation of a printed image.

EXAMPLES

The present invention will be explained in more detail while referring to the following non-limitative examples. The evaluation and measurement of the properties were made in the following methods. "Part" in examples and comparative examples means "part by weight".

(1) Intrinsic viscosity 1 g of the polymer was dissolved in 100 ml of a mixed solvent of phenol and tetrachloroethane in a weight ratio of 50:50, and the intrinsic viscosity was measured at 30° C. by using a Ubbellohde viscometer.

(2) Average particle diameter of particles

The particle diameters were measured by a sedimentation method in accordance with the Stokes' law of resistance by using a particle size distribution measuring machine SA-CP3 (trade name: produced by Shimazu Seisakusho Ltd.) by centrifugal sedimentation. The average particle diameter ($d_{50}$) was calculated as the diameter at the point of 50 wt % of the total accumulated value obtained by adding the measured values of all particles to each other in order of size as an equivalent sphere. Similarly, the particle diameter of the particles at the points of 25 wt % and 75 wt % were expressed as $d_{25}$ and $d_{75}$, respectively.

(3) Film thickness

The film thickness was measured by using a thickness gauge Mumetron, produced by Citizen Watch Co., Ltd.

(4) Melting point

The melting point was measured by using a differential scanning calorimeter SSC580DSC model 20 (produced by Seiko Instruments and Electronics, Ltd. ) under the following condition. 10 mg of a sample film was set in a DSC apparatus, and the temperature was raised at a rate of 10° C./min. The measurement was conducted in the range of 0° to 300° C., and the melting heat absorption peak was measured as the melting point. When there were at least two peaks, the melting point was determined as described above.

(5) Average heat shrinkage in machine and transverse directions

A sample was heat-treated in a non-tensioned state for 3 minutes in an oven which was held at 100° C. By measuring the lengths of the sample before and after the heat treatment, a heat shrinkage was calculated from the following formula:

$$\text{Heat shrinkage (\%)} = \frac{\text{(the length of the sample before heat treatment)} - \text{(the length of the sample after heat treatment)}}{\text{(the length of the sample before heat treatment)}} \times 100$$

The heat shrinkages of 5 samples were measured in both the machine and transverse directions, and the average value was obtained.

(6) Heat shrinkage stress

The film was cut to a strip of 10 mm wide, and one end was set at a chuck of a load detector and the other end was set at a fixed chuck. The distance between the chucks was 50 mm. The film was immersed in an oil bath having a predetermined temperature without applying the initial load to the film. The stress 5 seconds after the start of immersion was measured, and the heat shrinkage stress ($g/mm^2$) was calculated from the section area of the film before the immersion. The heat shrinkage stresses of 5 samples were measured in both the machine and transverse directions, and the average value was obtained.

The heat shrinkage stresses were measured at intervals of 10° C. between 60° C. and 140° C., and the maximum value of the nine values was expressed as the maximum average heat shrinkage stress.

(7) Center-line average surface roughness (Ra)

The center line average roughness was measured in the following way by using a surface roughness apparatus SE-3F, produced by Kosaka Kenkyusho K.K. From the profile curve of the film, a portion of a reference length of L (2.5 mm) was sampled in the direction of the center line. On the portion is the axis X, the machine direction is the axis Y, and the roughness curve is represented by y=f(x), the surface roughness (μm) was obtained from the following formula:

$$Ra = (1/L) \int_0^L |f(x)| dx$$

10 profile curves of the film were obtained from the surface of the sample film, and the center-line average surface roughnesses of the film was expressed by the average value of the center-line average surface roughnesses of the sampled portions. The radius of the tip of the probe was 2 μm, the load was 30 mg, and a cut off value was 0.08 mm.

(8) Maximum height (Rt) of film surface

The sampled portion of the profile curve of the film obtained at the time of measuring the center-line average surface roughness was sandwiched between two straight lines which are parallel to the center line of the sampled portion. The interval between the two straight lines was measured in the direction of the axial magnification of the film. This value (μm) was expressed as the maximum height of the sampled portion. 10 profile curves of the film were obtained from the surface of the sample film, and the maximum height of the film surface was expressed by the average value of the maximum height of the sampled portions.

(9) Practical properties of heat-sensitive stencil paper

The film was laminated with Japanese paper (washi) to produce heat-sensitive stencil paper. The heat-sensitive stencil paper was made into a stencil for letters and an image having a 12-staged gradation by using a thermal head while applying energies of 0.09 mJ and 0.12 mJ. The perforated state of the gradated image portion was observed through a microscope from the film side of the stencil paper which was made into the stencil to evaluate the perforation sensitivity.

(i) Perforation sensitivity.

○: Predetermined perforation was accurately performed. The openings were adequately large.

Δ: On rare occasions, predetermined perforation was not performed at some points, and some of the openings had an insufficient size. Allowable in practical use.

x: There were many portions at which predetermined perforation was not performed. The size of the openings was insufficient. Practical application was difficult.

The stencil was mounted on a RISOGRAPH printer AP7200 (produced by Riso Kagaku Kogyo K.K.) for actual printing. The letters and image obtained were visually judged with respect to the following properties.

(ii) Printing quality

○: Clearly printed without producing unevenness in the density or a blot.

Δ: Slight unevenness in the density and a few blots were observed. Not very clear.

x: Unevenness in the density, blots and blurs were distinctly observed. Practical application was difficult.

(iii) Printing durability

○: There was no change in the density and the resolution of the image after printing 2000 sheets.

Δ: A few blots were observed when about 1000 sheets were printed.

x: Many blots were observed on the image when about 100 sheets were printed. Practical application was difficult.

(10) Wind-up property 6000 m of the film produced at a line speed of about 170 m/min was wound up around a paper tube of 15 cm in diameter. The edge of the film was observed and the evaluation was divided into the following four ranks.

⊙: The edge surface was even.

○: The edge surface was approximately even. Allowable in practical use.

Δ: Part of the edge surface was uneven.

x: The edge surface was almost uneven.

EXAMPLE 1

100 parts of dimethyl terephthalate, 56 parts of 1,4-butanediol and 0.0075 part of tetrabutyl titanate were charged into a reactor. The initial reaction temperature was 150° C., and the temperature was gradually raised while distilling off methanol. The reaction temperature was raised to 210° C. in 3 hours. After the reaction was further continued for 1 hour, a polycondensation reaction was carried out by an ordinary method. As the temperature was gradually raised, the pressure was gradually reduced from the normal pressure. 2 hours after the start of the polycondensation reaction, the temperature was 260° C. and the pressure was 0.3 mmHg. 4 hours after the start of the reaction, the reaction was stopped and the polymer was drawn out under pressurization with nitrogen. The intrinsic viscosity of PBT obtained was 0.90.

Separately from this, an ester exchange reaction was carried out by using 100 parts of dimethyl terephthalate and 60 parts of ethylene glycol as the starting materials and adding 0.09 part of magnesium acetate tetrahydrate as a catalyst. Spherical silica particles which had an average particle diameter of 1.1 μm and $d_{25}/d_{75}$ of 1.2 were added as an ethylene glycol slurry. Further, 0.04 part of ethyl acid phosphate and 0.04 part of antimony trioxide were added to the reaction mixture to carry out polycondensation for 4 hours, thereby obtaining polyethylene terephthalate (polyester A). The intrinsic viscosity of the polyester A was 0.65, and the content of the spherical silica particles in the polymer was 0.7 wt %.

50 parts of the PBT and 50 parts of the polyester A were mixed. The resultant mixture was extruded at 280° C. from an extruder in the form of a sheet, and rapidly cooled and hardened on a rotary cooling drum with the surface temperature set at 20° C. by an electrostatic pinning method. In this way, a substantially amorphous sheet having a thickness of 32 μm was obtained.

The amorphous sheet was then stretched in the machine direction to 4.3 times at 65° C. and in the transverse direction to 4.6 times at 70° C. The film was then heat-treated at 90° C. for 6 seconds, thereby obtaining a biaxially oriented film having a thickness of 2.0 μm. The film obtained was laminated with thin porous paper by an ordinary method so as to produce heat-sensitive stencil paper. The physical properties of the film and the printing properties at the time of mimeographing are shown in Tables 1 and 2.

EXAMPLE 2

A polyethylene terephthalate-isophthalate copolymer (copolymer B) was produced. In the copolymer B, 80 mol % of the acid component was terephthalic acid, 20 mol % thereof was isophthalic acid, and the glycol component was ethylene glycol. The intrinsic viscosity of the copolymer B was 0.68. The copolymer contained 0.7 wt % of monodispersed crosslinked polymer particles (the main ingredients were styrene and divinylbenzene units) which had an average particle diameter of 0.6 μm and $d_{25}/d_{75}$ of 1.25.

45 parts of the PBT produced in Example 1 and 55 parts of the copolymer B were mixed, and a substantially amorphous sheet having a thickness of 35 μm was obtained in the same way as in Example 1. The amorphous sheet was then stretched at 60° C. to 4.2 times in the machine direction and 4.5 times in the transverse direction. The film was then heat-treated at 85° C. for 6 seconds while holding the film at a constant width, thereby obtaining a biaxially oriented film having a thickness of 2.0 μm. Heat-sensitive stencil paper was produced from the film in the same way as in Example 1. The physical properties of the film and the printing properties at the time of mimeographing are shown in Tables 1 and 2.

EXAMPLE 3

70 parts of the PBT produced in Example 1 and 30 parts of the copolymer B produced in Example 2 were mixed, and a substantially amorphous sheet having a thickness of 40 μm was obtained in the same way as in Example 1. The amorphous sheet was then simultaneously biaxially stretched at 70° C. to 4.5×4.5 times. The sheet was then heat-treated at 95° C. for 30 seconds while holding the film at a constant length, thereby obtaining a biaxially oriented film having a thickness of 2.2 μm. Heat-sensitive stencil paper was produced from the film in the same way as in Example 1. The physical properties of the film and the printing properties at the time of mimeographing are shown in Tables 1 and 2.

COMPARATIVE EXAMPLE 1

A biaxially oriented film having a thickness of 2.0 μm was produced in the same way as in Example 1 except for changing the heat treatment temperature to 140° C. and relaxing the film by 10% in the transverse direction during the heat treatment. Heat-sensitive stencil paper was produced from the film in the same way as in Example 1. The physical properties of the film and the printing properties at the time of mimeographing are shown in Tables 1 and 2.

COMPARATIVE EXAMPLE 2

A biaxially oriented film having a thickness of 6.0 μm was obtained in the same way as in Example 1 except for changing the polymer extrusion rate. Heat-sensitive stencil paper was produced from the film in the same way as in Example 1. The physical properties of the film and the printing properties at the time of mimeographing are shown in Tables 1 and 2.

COMPARATIVE EXAMPLE 3

A biaxially oriented film having a thickness of 2.0 μm. was obtained in the same way as in Example 1 except for changing the mixing ratio of the raw materials to 15 parts of the PBT and 85 parts of the polyester A, the temperature at which the sheet was stretched in the machine direction to 85° C., and the temperature at which the sheet was stretched in the transverse direction to 100° C. Heat-sensitive stencil paper was produced from the film in the same way as in Example 1. The physical properties of the film and the printing properties at the time of mimeographing are shown in Tables 1 and 2.

COMPARATIVE EXAMPLE 4

The same process as in Example 1 was adopted except for changing the mixing ratio of the raw materials to 85 parts of the PBT and 15 parts of the polyester A. In this case, since the stretch properties were poor, the film was frequently teared, so that it was impossible to produce a satisfactory biaxially oriented film.

and at the time of the production of the stencil paper. The stencil paper formed therefrom was excellent in the perforation sensitivity, so that a good mimeographing property was exhibited.

In contrast, since the film in Comparative Example 1 had an insufficient shrinkage, the thickness of the film in Comparative Example 2 was too large, and the film in Comparative Example 3 did not contain a determined amount PBT, the perforation sensitivity of the stencil paper formed therefrom was inferior.

EXAMPLE 4

An ester exchange reaction was carried out by using 90 parts of dimethyl terephthalate, 10 parts of dimethyl isophthalate and 60 parts of ethylene glycol as the starting materials and adding 0.09 part of magnesium acetate tetrahydrate as a catalyst. Spherical silica particles which had an average particle diameter of 1.1 μm and $d_{25}/d_{75}$ of 1.2 were added as an ethylene glycol slurry. Further, 0.04 part of ethyl acid phosphate and 0.04 part of antimony trioxide were added to the reaction mixture to carry out polycondensation for 4 hours, thereby obtaining a polyethylene terephthalate-isophthalate copolymer (copolymer C). The intrinsic viscosity of the copolymer C was 0.67, and the content of the spherical silica particles in the polymer was 1.0 wt %.

50 parts of the PBT produced in Example 1 and 50 parts of the copolymer C were mixed. The resultant mixture was extruded at 280° C. from an extruder in the form of a sheet, and rapidly cooled and hardened on a rotary cooling drum with the surface temperature set at 20° C. by an electrostatic pinning method. In this way, a substantially amorphous sheet having a thickness of 32 μm was obtained.

The amorphous sheet was then stretched in the machine direction to 4.5 times at 60° C. and in the transverse direction to 4.0 times at 70° C. The film was then heat-treated at 90° C. for 6 seconds, thereby obtaining a biaxially oriented film having a thickness of 1.9 μm. Heat-sensitive stencil paper was produced from the film in the same way as in Example 1. The physical properties of the film and the printing properties at the time of mimeographing are shown in Tables 3 and 4.

EXAMPLE 5

A PBT copolymer (copolymer D) was produced in the same way as in the production of the PBT in Example 1 by using 80 parts of dimethyl terephthalate, 20 parts of dim-

TABLE 1

| | Heat shrinkage stress (g/mm²) | | Maximum average heat shrinkage stress | Average heat shrinkage | Surface roughness (μm) | | Melting heat absorption |
|---|---|---|---|---|---|---|---|
| | machine | transverse | (g/mm²) | ratio (%) | Ra | Rt | peak (°C.) |
| Example 1 | 630 | 670 | 650 | 45 | 0.052 | 0.60 | 205*, 218 |
| Example 2 | 590 | 630 | 610 | 50 | 0.040 | 0.52 | 200, 217* |
| Example 3 | 560 | 560 | 560 | 55 | 0.030 | 0.45 | 210, 225* |
| Comparative Example 1 | 400 | 300 | 350 | 15 | 0.050 | 0.61 | 206*, 219 |
| Comparative Example 2 | 560 | 580 | 570 | 40 | 0.042 | 0.55 | 208*, 221 |
| Comparative Example 3 | 820 | 880 | 850 | 56 | 0.060 | 0.80 | 226, 250* |

*regarded as melting point

TABLE 2

| | Practical properties of stencil paper (0.09 mJ/0.12 mJ) | | |
|---|---|---|---|
| | Perforation sensitivity | Printing quality | Printing durability |
| Example 1 | o/o | o/o | Δ/Δ |
| Example 2 | o/o | o/o | Δ/Δ |
| Example 3 | Δ/o | Δ/o | o/Δ |
| Comparative Example 1 | x/Δ | x/Δ | o/o |
| Comparative Example 2 | x/Δ | x/x | Δ/Δ |
| Comparative Example 3 | x/Δ | Δ/Δ | Δ/Δ |

Each of the films in Examples 1 to 3 was excellent in the handling property at the time of the production of the film ethyl isophthalate and 56 parts of 1,4-butanediol as the starting materials. 0.4 wt % of synthetic calcium carbonate particles which had an average particle diameter of 0.6 μm and $d_{25}/d_{75}$ of 1.45 were mixed with the copolymer D by using a twin screw extruder. The intrinsic viscosity of the particles-containing polymer obtained was 0.85. A biaxially oriented film having a thickness of 2.2 μm was produced from the polymer in the same way as in Example 1. Stencil paper was produced from the film in the same way as in Example 4. The physical properties of the film and the printing properties at the time of mimeographing are shown in Tables 3 and 4.

part of organic particles (crosslinked polymer particles) which had an average particle diameter of 0.35 μm and $d_{25}/d_{75}$ of 1.4 was added to the reaction mixture. Further, 0.04 part of ethyl acid phosphate and 0.04 part of antimony trioxide were added to the reaction mixture to carry out polycondensation for 4 hours.

As the temperature was gradually raised from 230° C. to 280° C., the pressure was gradually reduced from the normal pressure to 0.3 mmHg. 4 hours after the start of the reaction, the reaction was stopped and the polymer was drawn out under pressurization with nitrogen. The intrinsic viscosity of the polyester obtained was 0.72. This polyester will be

TABLE 3

| | Heat shrinkage stress (g/mm²) | | Maximum average heat shrinkage stress (g/mm²) | Average heat shrinkage ratio (%) | Surface roughness (μm) | | Melting heat absorption peak (°C.) |
| --- | --- | --- | --- | --- | --- | --- | --- |
| | machine | transverse | | | Ra | Rt | |
| Example 4 | 760 | 500 | 630 | 48 | 0.055 | 0.62 | 200, 215* |
| Example 5 | 590 | 460 | 525 | 65 | 0.055 | 0.92 | 190 |

*regarded as melting point

TABLE 4

| | Practical properties of stencil paper (0.09 mJ/0.12 mJ) | | |
| --- | --- | --- | --- |
| | Perforation sensitivity | Printing quality | Printing durability |
| Example 4 | o/o | o/o | o/o |
| Example 5 | Δ/o | Δ/o | Δ/Δ |

Each of the films in Examples 4 and 5 was excellent in the handling property at the time of the production of the film and at the time of the production of the stencil paper. The stencil paper formed therefrom was excellent in the perforation sensitivity, so that a good mimeographing property was exhibited.

EXAMPLES 6 TO 11

Production of polyester-1

80 parts of dimethyl terephthalate, 20 parts of dimethyl isophthalate and 60 parts of ethylene glycol as the starting materials and 0.09 part of magnesium acetate tetrahydrate as a catalyst were charged into a reactor. The initial reaction temperature was 150° C., and the temperature was gradually raised while distilling off methanol. The reaction temperature was raised to 230° C. in 3 hours. 4 hours after the start of the reaction, the ester exchange reaction was substantially finished. 10 parts of an ethylene glycol slurry containing 0.6 referred to as a polyester E. Another polyester (polyester I) was produced in the same manner. The composition thereof is shown in Table 5.

Production of polyester-2

100 parts of dimethyl terephthalate, 56 parts of 1,4-butanediol and 0.005 part of tetrabutyl titanate were charged into a reactor. The initial reaction temperature was 150° C., and the temperature was gradually raised while distilling off methanol. The reaction temperature was raised to 210° C. in 3 hours. 4 hours after the start of the reaction, the ester exchange reaction was substantially finished. 10 parts of an 1,4-butanediol slurry containing 0.1 part of spherical silica particles which had an average particle diameter of 1.0 μm and $d_{25}/d_{75}$ of 1.2 was added to the reaction mixture. Further, 0.005 part of tetrabutyl titanate was added as a polymerization catalyst and polycondensation was carried out by an ordinary method.

As the temperature was gradually raised from 210° C. to 260° C., the pressure was gradually reduced from the normal pressure to 0.3 mmHg. 4 hours after the start of the reaction, the reaction was stopped and the polymer was drawn out under pressurization with nitrogen. The intrinsic viscosity of the polyester obtained was 0.90. This polyester will be referred to as a polyester F. Other polyesters (polyesters G, H, J and K) were produced in the same manner. The compositions thereof are shown in Table 5.

TABLE 5

| | Polyester composition (mol %) | | | | Particles | | | |
| --- | --- | --- | --- | --- | --- | --- | --- | --- |
| Polyester | DMT | DMI | EG | 14BD | Kind | Mohs hardness | Particle diameter (μm) | $d_{25}/d_{75}$ | Amount added (wt %) |
| E | 80 | 20 | 100 | — | Organic particles | — | 0.35 | 1.4 | 0.6 |
| F | 100 | — | — | 100 | Spherical silica | 5.5 | 1.00 | 1.2 | 0.1 |

TABLE 5-continued

| Polyester | Polyester composition (mol %) | | | | Particles | | | | Amount added (wt %) |
|---|---|---|---|---|---|---|---|---|---|
| | DMT | DMI | EG | 14BD | Kind | Mohs hardness | Particle diameter (μm) | $d_{25}/d_{75}$ | |
| G | 100 | — | — | 100 | Celite | 6 | 1.20 | 1.4 | 0.1 |
| H | 100 | — | — | 100 | Alumina | 9 | 0.95 | 1.4 | 0.1 |
| I | 90 | 10 | 100 | — | Organic particles | — | 0.35 | 1.4 | 0.6 |
| J | 70 | 30 | — | 100 | Spherical silica | 5.5 | 1.00 | 1.2 | 0.1 |
| | | | | | Organic particles | — | 0.35 | 1.4 | 0.6 |
| K | 100 | — | 70 | 30 | Spherical silica | 5.5 | 1.00 | 1.2 | 0.1 |
| | | | | | Organic particles | — | 0.35 | 1.4 | 0.6 |

Production of Film

Each of the polyesters shown in Table 6 was extruded at 280° C. from an extruder in the form of a sheet, and rapidly cooled and hardened on a rotary cooling drum with the surface temperature set at 30° C. by an electrostatic pinning method. In this way, a substantially amorphous sheet having a thickness of 32 μm was obtained.

The amorphous sheet was then stretched in the machine direction to 4.5 times at 65° C. and in the transverse direction to 4.3 times at 70° C. The film was then heat-treated at 90° C. for 6 seconds, thereby obtaining a biaxially oriented film having a thickness of 1.5 μm.

The film obtained was laminated with thin porous paper by an ordinary method so as to produce stencil paper. The physical properties of the film and the printing properties at the time of mimeographing are shown in Tables 6 to 8.

TABLE 6

| | Polyester (wt %) | Wind-up property |
|---|---|---|
| Example 6 | E(50) F(50) | ⊚ |
| Example 7 | E(50) G(50) | ⊚ |
| Example 8 | E(50) H(50) | ⊚ |
| Example 9 | I(50) F(50) | ⊚ |
| Example 10 | J(110) | ⊚ |
| Example 11 | K(100) | ⊚ |

TABLE 7

| | Heat shrinkage stress (g/mm²) | | Maximum average heat shrinkage stress (g/mm²) | Average heat shrinkage ratio (%) | Surface roughness (μm) | | Melting heat absorption peak (°C.) |
|---|---|---|---|---|---|---|---|
| | machine | transverse | | | Ra | Rt | |
| Example 6 | 620 | 510 | 565 | 50 | 0.034 | 0.55 | 219*, 201 |
| Example 7 | 620 | 510 | 560 | 45 | 0.036 | 0.70 | 218*, 203 |
| Example 8 | 630 | 510 | 570 | 45 | 0.035 | 0.60 | 219*, 202 |
| Example 9 | 720 | 510 | 615 | 42 | 0.038 | 0.52 | 219*, 205 |
| Example 10 | 550 | 450 | 500 | 65 | 0.042 | 0.76 | 170 |
| Example 11 | 520 | 430 | 475 | 60 | 0.045 | 0.73 | 200 |

*regarded as melting point

TABLE 8

| | Practical properties of stencil paper (0.09 mJ/0.12 mJ) | | |
|---|---|---|---|
| | Perforation sensitivity | Printing quality | Printing durability |
| Example 6 | o/o | o/o | o/o |
| Example 7 | o/o | o/o | o/o |
| Example 8 | o/o | o/o | o/o |
| Example 9 | o/o | o/o | o/o |
| Example 10 | o/o | o/o | Δ/Δ |
| Example 11 | o/o | o/o | Δ/Δ |

What is claimed is:

1. A film for heat-sensitive stencil paper, comprising a biaxially oriented film having a thickness of 0.5 to 6.0 μm and formed from a polyester composition comprising polybutylene terephthalate and another polyester, wherein:

said polybutylene terephthalate comprises 20 to 80% by weight of said polyester composition, wherein: said another polyester comprises a dicarboxylic acid component and a glycol component, the maximum value of average heat shrinkage stresses in the machine and transverse directions of the film measured at a film temperature of 60° to 140° C. is more than 300 g/mm$_2$, the heat shrinkage of the film by treatment at 100° C. for 3 minutes is not less than 20%, the melting point of the film measured by differential scanning calorimetry is in the range of 150° to 240° C., and the film has at least two melting heat absorption peaks in differential scanning calorimetry, the difference in temperature between said heat absorption peaks being not less than 5° C.

2. A film for heat-sensitive stencil paper according to claim 1, wherein an average value of a heat shrinkage stress (Sin) (g/mm$^2$) in the machine direction (a direction of scanning by a thermal head) measured at a film temperature of 100° C. and a heat shrinkage stress (St) (g/mm$^2$) in the transverse direction (a direction perpendicular to the direction of scanning by the thermal head) measured at a film temperature of 100° C. is not less than 300 (g/mm$^2$), and a ratio (Sm/St) of said heat shrinkage stresses (Sm and St) measured at a film temperature of 100° C. is in the range of 1.2 to 5.

3. A film for heat-sensitive stencil paper according to claim 1, wherein said polyester composition contains (A) 0.005 to 0.3 wt % of particles which have an average particle diameter ($d_1$) of 0.6 to 3.0 μm and a Mohs hardness of not less than 5; and (B) 0.05 to 3 wt % of particles which have an average particle diameter ($d_2$) of 0.06 to 0.8 μm, and $d_1/d_2$ of 2 to 10.

4. A film for heat-sensitive stencil paper according to claim 1, wherein said melting point is in the range of 205° to 240° C.

5. A film for heat-sensitive stencil paper according to claim 1, wherein said maximum value of average heat shrinkage stresses in the machine and transverse directions of the film measured at a film temperature of 60° to 140° C. is 500 to 1500 g /mm$^2$.

6. A film for heat-sensitive stencil paper according to claim 1, wherein said film has a center-line average surface roughness (Ra) of 0.01 to 0.4 μm and a maximum height (Rt) of 0.4 to 3 μm.

7. A film for heat-sensitive stencil paper according to claim 1, wherein said film comprises 50 parts polybutylene terephthalate and 50 parts of said other polyester.

8. A film for heat-sensitive stencil paper according to claim 1, wherein said film comprises 45 parts polybutylene terephthalate and 55 parts of said other polyester.

9. A film for heat-sensitive stencil paper according to claim 1, wherein said film comprises 50 parts polybutylene terephthalate and 50 parts of said other polyester.

10. A film for heat-sensitive stencil paper according to claim 1, wherein said film comprises 70 parts polybutylene terephthalate and 30 parts of said other polyester.

11. A film for heat-sensitive stencil paper according to claim 1, wherein the difference in temperature between said heat absorption peaks is from 10° to 50° C.

12. A film for heat-sensitive stencil paper according to claim 1, wherein said heat shrinkage of the film by treatment at 100° C. for 3 minutes is from 30% to 80%.

13. A film for heat-sensitive stencil paper according to claim 1, wherein said film has a tensile modulus of not less than 350 kg/mm$^2$ in both the machine and transverse directions.

14. A film for heat-sensitive stencil paper according to claim 2, wherein said ratio ($S_m/S_t$) is from 1.5 to 3.5.

15. A film for heat-sensitive stencil paper according to claim 4, wherein the number of the particles (A) in 1 g of the polyester composition is from $8.85 \times 10^5$ to $1.33 \times 10^{10}$ and the number of the particles (B) in 1 g of the polyester composition is from $4.67 \times 10^8$ to $2.65 \times 10^{14}$.

16. A film for heat-sensitive stencil paper according to claim 3, wherein the particle size distribution $d_{25}/d_{75}$ of the particles (A) and (B) is from 1.0 to 1.5, respectively.

17. A film for heat-sensitive stencil paper according to claim 4, wherein the particle size distribution $d_{25}/d_{75}$ of the particles (A) and (B) is from 1.1 to 1.3, respectively.

18. A film for heat-sensitive stencil paper according to claim 3, wherein the Mohs hardness of the particles (A) is not less than 5.5.

19. A film for heat-sensitive stencil paper according to claim 3, wherein the average particle diameter ($d_1$) of the particles (A) is from 0.8 to 2.0 μm, and the average particle diameter ($d_2$) of the particles (B) is from 0.1 to 0.6 μm.

* * * * *

UNITED STATES PATENT AND TRADEMARK OFFICE
CERTIFICATE OF CORRECTION

PATENT NO. : 5,466,521
DATED : November 14, 1995
INVENTOR(S) : Yoshinori Sato, et. al.

It is certified that error appears in the above-indentified patent and that said Letters Patent is hereby corrected as shown below:

Title page, under item [73], [*] Notice: delete "Apr. 4, 2006" and insert-- March 23, 2014--.

Signed and Sealed this

Fourth Day of June, 1996

Attest:

BRUCE LEHMAN

Attesting Officer

Commissioner of Patents and Trademarks